(12) United States Patent
Chincheck et al.

(10) Patent No.: US 7,149,897 B2
(45) Date of Patent: Dec. 12, 2006

(54) SYSTEMS AND METHODS FOR PROVIDING INCREASED COMPUTER SECURITY

(75) Inventors: Stanley Chincheck, Alexandria, VA (US); Myong Hoon Kang, Fairfax, VA (US); Ira S Moskowitz, Washington, DC (US); Jim Parsonese, Apex, NC (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 248 days.

(21) Appl. No.: 10/627,102

(22) Filed: Jul. 25, 2003

(65) Prior Publication Data

US 2005/0022023 A1 Jan. 27, 2005

(51) Int. Cl.
*H04L 9/00* (2006.01)
*H04L 9/32* (2006.01)
*H04L 1/00* (2006.01)

(52) U.S. Cl. .................. 713/166; 713/150; 713/151; 713/152; 713/153; 713/154; 713/155; 713/168; 713/192; 726/2; 726/3; 726/15; 726/16; 709/225; 709/227; 709/229; 340/825; 340/517

(58) Field of Classification Search ............... 713/200, 713/201, 166, 168, 155–159; 709/223; 726/2–3, 726/15–16; 340/825

See application file for complete search history.

(56) References Cited

U.S. PATENT DOCUMENTS

| | | | |
|---|---|---|---|
| 5,448,698 A * | 9/1995 | Wilkes | 709/245 |
| 5,511,122 A | 4/1996 | Atkinson | |
| 5,867,647 A * | 2/1999 | Haigh et al. | 713/200 |
| 5,872,847 A * | 2/1999 | Boyle et al. | 713/151 |
| 5,983,350 A | 11/1999 | Minear et al. | |
| 6,182,226 B1 | 1/2001 | Reid et al. | |
| 6,438,612 B1 | 8/2002 | Ylonen et al. | |
| 6,772,332 B1 * | 8/2004 | Boebert et al. | 713/153 |

OTHER PUBLICATIONS

"A security model for dynamic adaptive traffic masking" http://delivery.acm.org/10.1145/290000/283748/p107-116timmerman.pdf?key1=283748&key2=2154393411&coll=ACM&CFID=68579336&CFTOKEN=84154381.*

Wyong H. Kang, Andrew P. Moore and Ira S. Moskowitz, Design And Assurance Strategy For The NRL Pump, Journal, 1998 IEEE, pp. 56-64.

Myong H. Kang, Ira S. Moskowitz and Daniel C. Lee, A Network Pump, Journal, IEEE Transactions On Software Engineering, vol. 22, No. 5, May 1996, pp. 329-338.

* cited by examiner

Primary Examiner—Syed A. Zia
(74) Attorney, Agent, or Firm—John J. Karasek; Thomas D. Robbins

(57) ABSTRACT

In a communication system having a plurality of networks, a method of achieving network separation between first and second networks is described. First and second networks with respective first and second degrees of trust are defined, the first degree of trust being higher than the second degree of trust. Communication between the first and second networks is enabled via a network interface system having a protocol stack, the protocol stack implemented by the network interface system in an application layer. Data communication from the second network to the first network is enabled while data communication from the first network to the second network is minimized.

3 Claims, 7 Drawing Sheets

SYSTEMS AND METHODS FOR PROVIDING INCREASED COMPUTER SECURITY

FIELD OF THE INVENTION

This invention generally relates to computer security. At least some embodiments of the invention relate to system and methods for separating networks and providing increased computer security by controlling leakage of information from a high security network to a low security network.

BACKGROUND OF THE INVENTION

There has been an explosion in growth of computer networks as organizations realize the benefits of networking their personal computers and workstations. Increasingly, these networks are falling prey to malicious outsiders who hack into their network, reading and sometimes destroying sensitive information. Traditional guard products have been developed in software running on a commercial computer. The software that provides the information flow is usually an application that resides on a commercial operating system, such as UNIX or Windows. The traditional devices also rely on a relational database management system (RDBMS) to manage and store the data. Software complexity and reliance on the operating system have proven to diminish the performance of these approaches, thus essentially crippling any thorough security evaluation of the product. In addition, all data is mixed in the same processor when implemented in a single commercial computer.

Other systems using blind write-up or blind read-down techniques fail to provide assurance that data reaching a destination is not overwritten. The resolution to ensuring the reliability of the communications between a transmitter (transmitting network) and a receiver (receiving network) is to utilize acknowledgments by the receiver—however, providing such acknowledgments does not maintain the security of the network with higher trust. Communications between the networks is no longer a one-way data path as acknowledgments must flow from the network of higher trust to the network of lower trust—creating the potential to compromise data on the network with higher trust.

Simple store-and-forward machines can isolate the two networks, however many of the characteristics of trusted networks are relayed through the store-and-forward system, thus may compromise data through covert channels via response time, latency, buffer utilization, negative acknowledgment, etc.

To ensure correct operation of the operating system (OS) and RDBMS, a system administrator must be resourced to support the product to ensure that software inherent to the operation of the device is maintained. In addition, as an OS and RDBMS mature and progress through lifecycle evolution, the likelihood that a custom software application will continue to operate correctly is diminished.

A software implementation of a network security pump was described by Kang, Moore, and Moskowitz in their article Design and Assurance Strategy for the NRL Pump, IEEE Computer, April 1998. This software simulation, which provided some boundaries on the pump algorithm, uses "wrappers" or software that supports a variety of applications and differs from the hardware implementation of the invention described by the instant patent application.

SUMMARY OF THE INVENTION

At least some embodiments of the invention relate to systems and methods for providing increased computer security by separating the networks and controlling information flow from a high security network to a low security network.

In one aspect, in a communication system having a plurality of networks, a method of achieving network separation between first and second networks is described. The method includes defining the first network with a first degree of trust, defining the second network with a second degree of trust that is lower than the first degree of trust, enabling communication between first and second networks via a network interface system using a communication protocol implemented in an application layer of a communication protocol stack, and enabling data communication from the second network to the first network while minimizing data communication from the first network to the second network.

The method also includes enabling applications operating on the second network to pass information to applications operating on the first network, receiving an acknowledgment from the network interface system that information delivered by the second network to the first network has been successfully received, configuring the network interface system into first and second regions for performing respective processing tasks of the first and second networks. The configuring of the network interface preferably includes implementing the network interface system with distinct sets of first and second processors, the first and second processors having a shared memory.

The method further includes defining addresses in a user configuration table of the network interface system, accepting information sent from the second network and only from addresses matching the addresses defined in the user configuration table, configuring a protocol for use with the network interface system such that only valid connection requests are initiated via the protocol. Preferably, the network interface system protocol enforces connection limits on data transfer to prevent saturation of the network interface system by a connection initiated from the second network. Communications between the first and second regions are preferably enabled via an interprocessor communication channel. The method also includes enabling data communication from the second network to the first network via the interprocessor communication channel, and configuring the interprocessor communication channel to communicate a value based on the moving averages from the first network to the second network.

The network interface system is preferably configured to prevent the shared memory from overflowing by controlling the rate at which messages are acknowledged by the network interface system. The rate of acknowledgments is probabilistic, with a mean rate based on a moving average of the rate at which the first network is accepting messages from the second network. An application program loaded in the network interface system is configured to support the network interface system protocol such that each application on the first and second networks using the network interface system communicates with a first and second application program interfaces, respectively, of the first and second networks.

The protocol stack is implemented in an application layer to provide application level reliability and application independence. Acknowledgments are received, at the application protocol layer, for messages transmitted from the network interface system to the first network, and acknowledgments are communicated from the network interface system to the second application program interface, the acknowledgments delivered in a fixed, predefined format.

The acknowledgments are preferably provided to the second application program interface indicates that the network interface system successfully received data to be transmitted and stored in the shared memory, and wherein the acknowledgment is generated by the network interface system. For each active connection, a distinct variable is maintained that reflects a moving average of the time it takes for the first application program interface to accept messages from the second network. Messages received from the second application program interface over the active connection are delayed based on the moving average using a random variable preferably of a pseudo-exponential or_similar type, and messages are received at the application layer, wherein information flow from the first application program interface to the second application program interface occurs through changes in values based on the moving average.

In another aspect, a network separation method for achieving network separation between first and second networks of a communication system is described. The method includes providing a computer server configured to have a communication protocol stack implemented in an application layer, enabling data communication from the second network to the first network via the computer server, the first network having a higher degree of trust than the second network, and wherein the rate of acknowledgment of messages by the computer server is probabilistic with a mean rate based on a moving average of the rate at which the first network accepts messages sent from the second network.

In an additional aspect, a system for achieving network separation between first and second networks of a communication system is provided. The system includes a first processor for processing information from the first network, a second processor for processing information from the second network, the first network having a higher degree of trust than the second network, and wherein the rate of acknowledgment of messages by the system is probabilistic with a mean rate based on a moving average of the rate at which the first network accepts messages sent from the second network.

Other aspects of the invention are disclosed herein as is apparent from the following description and figures.

BRIEF DESCRIPTION OF THE DRAWINGS

Preferred embodiments of the invention are described below with reference to the following accompanying drawings.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
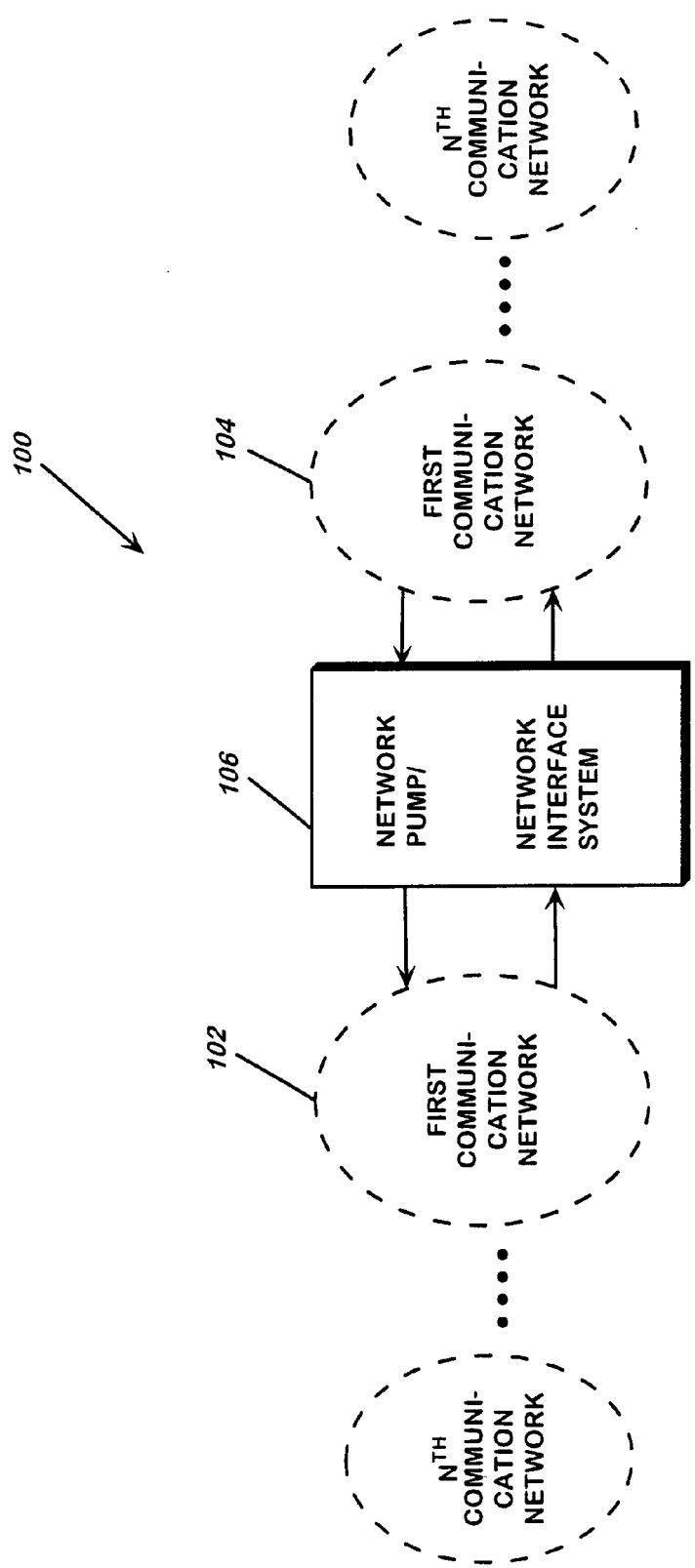
FIG. 1 is a high-level schematic of a communication network system having a network interface system/network pump in accordance with an exemplary embodiment of the present invention.

Referring to FIG. 1, there is shown in one embodiment of the present invention a high-level schematic of a communication network system 100 having a first communication network 102 having a first level of security or level of trust "x", and a second communication network 104 having a second level of security "y", where y<x. Data communication between first and second networks 102, 104 is enabled through a network interface system 106. The network interface system 106 is also alternatively referred to herein as network pump 106 or computer system/server 106 for ease of convenience in better explaining the inventive concept. A preferred communications path for data is from a network with lower trust/lower level of security to a network with higher trust/higher level of security. The network pump 106 may be conveniently implemented in a computer system, a computer server, an application specific integrated circuit, or the like. Further details of the network pump 106 are described at FIG. 3.

Figure 2:
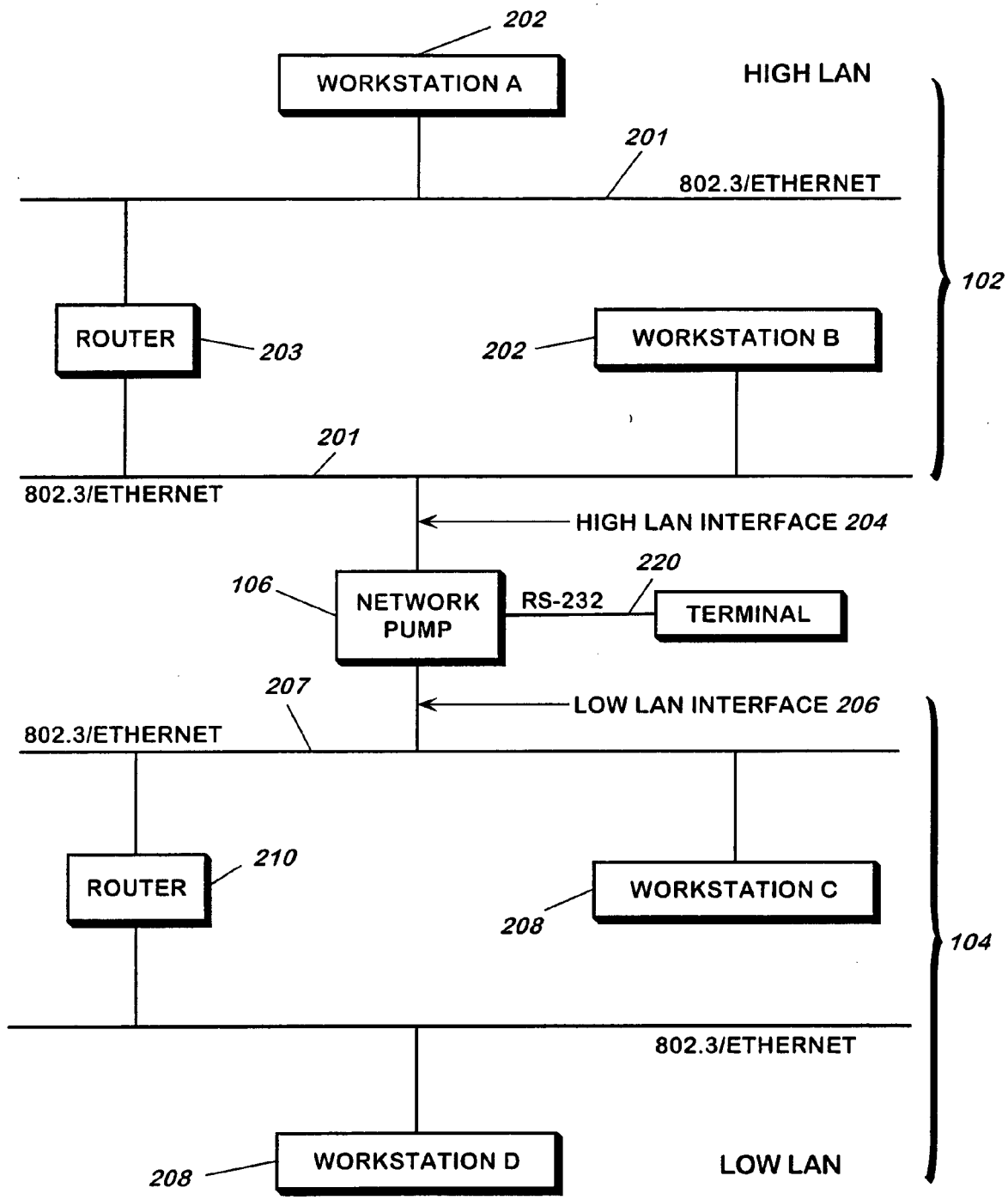
FIG. 2 is a detailed schematic of a communication network having a network pump shown in FIG. 1.

FIG. 2 shows a detailed schematic illustrating interconnection of the network pump 106 between communication networks 102 and 104. Communication network 102 may include one or more workstations 202 communicatively coupled via a bus 201, such as for example, 802.3/Ethernet bus. Buses 201 may be interconnected via a router 203 for information delivery. Similarly, workstations 208 of communication network 104 may be communicatively coupled via a bus 207, and buses 207 may be interconnected via a router 210. Network pump 106 includes an interface 204 (identified as high LAN interface) configured to connect to bus 201 of the first communication network 102, an interface 206 (identified as low LAN interface) configured to connect to bus 207 of the second communication network 104. The network pump 106 also includes an interface 208 configured to connect to a terminal, such as, for example, a network administration terminal for network administration purposes.

Figure 3:
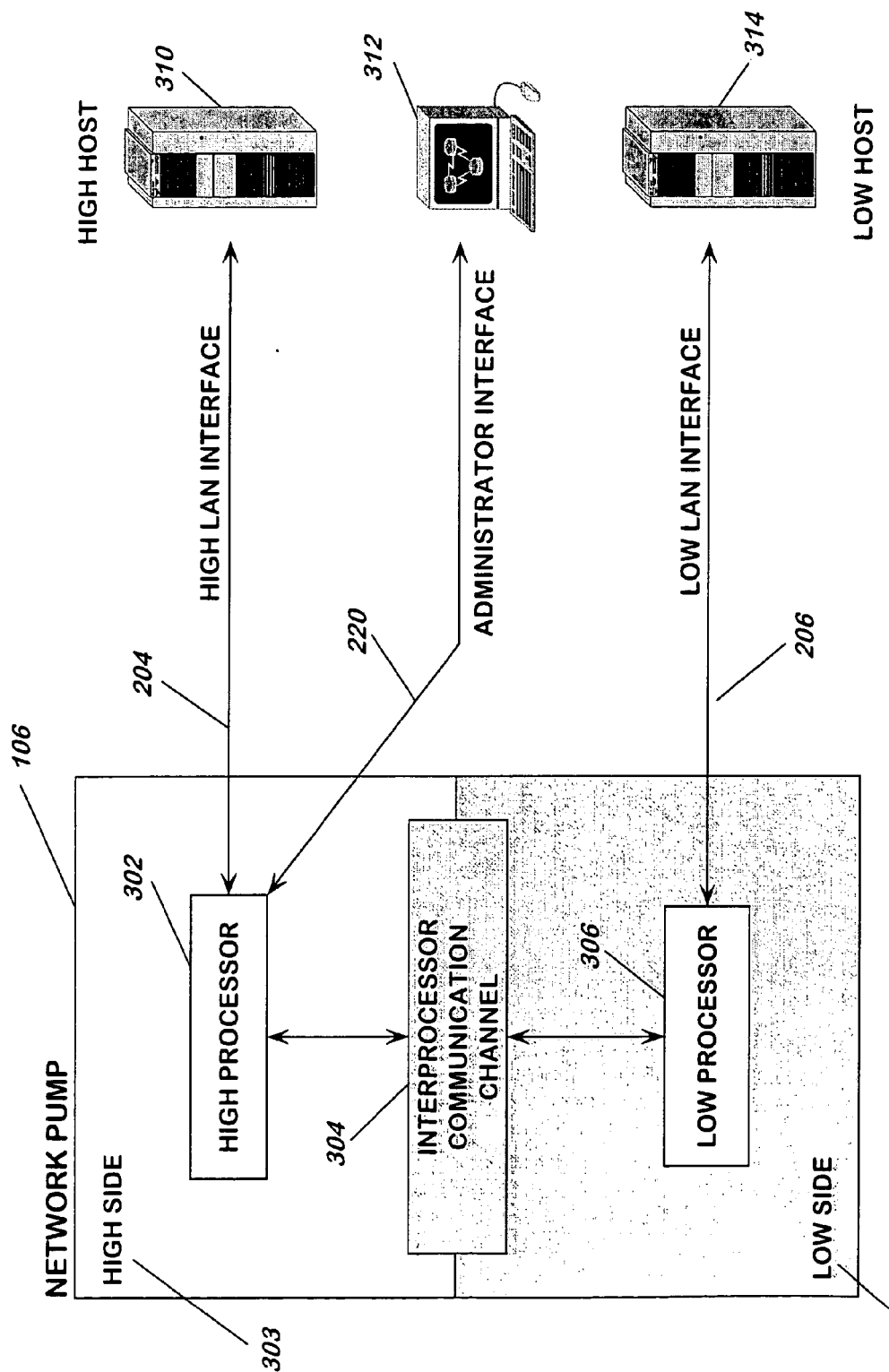
FIG. 3 is a high-level system architecture of the network pump in an exemplary embodiment of the present invention.

FIG. 3 shows a high-level architectural schematic of the network pump 106 shown in FIG. 1, in one embodiment of the present invention. The network pump architecture is separated into two functional areas, a low side 301 and a high side 303. The network pump 106 includes a processor 302 configured to process information related to the first communication network 102, a processor 306 configured to process information related to the second communication network 104. Although not shown in FIG. 3, the network pump 106 may include other components of a computer server. Such components include, for example, a storage device for storing information, etc.

Figure 4:
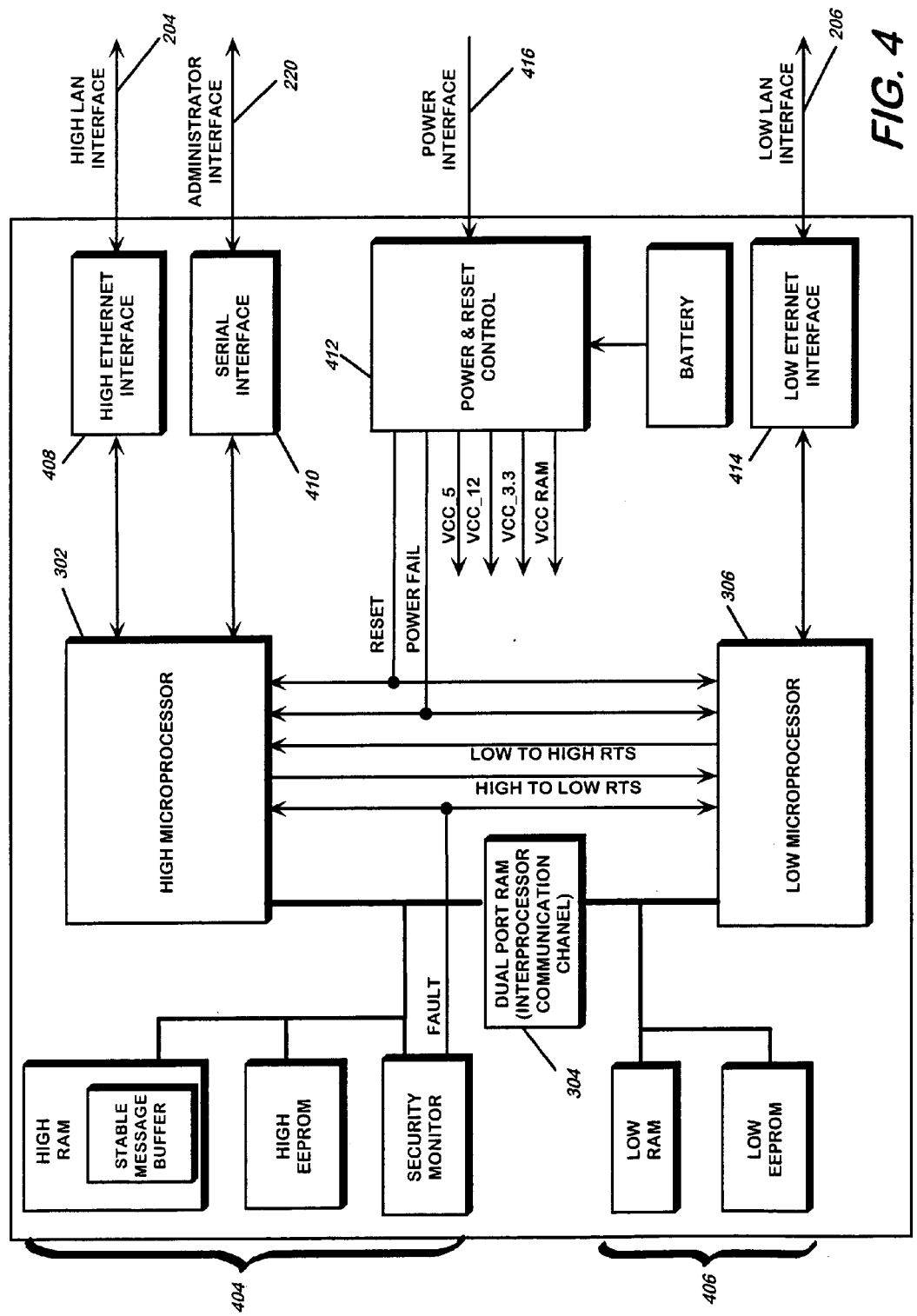
FIG. 4 is a hardware architecture of the network pump in an exemplary embodiment of the present invention.

The low side 301 (i.e., low LAN computer software configuration item which executes on the low processor 306, low memory 406 (FIG. 4), and other assorted hardware support components including, for example, Ethernet interface 414) is responsible for control, status, and data exchange with the low host 314 via a communication protocol used by the network pump for communicating information, the communication protocol alternatively referred to herein as a "pump protocol." The high side 303 (i.e., high LAN computer software configuration item, which executes on the high processor 302, high memory 404 (FIG. 4), and assorted hardware support components including, for example, Ethernet interface 408) is responsible for control, status, and data exchange with the high host 310 via the pump protocol. FIG. 4 shows detailed hardware architecture schematic of the network pump shown in FIG. 3.

Communication between the high side 303 and the low side 301 of the network pump 106 is provided via an interprocessor communication channel 304 configured to communicate pump messages from the low side 301 to the high side 303 as well as message acknowledgements with a rate based on the moving averages of high side activity in removing messages from the stable message buffer; from the high side 303 to the low side 301. Limited status and control information is also exchanged between the low microprocessor 306 and the high processor 302. It will be appreciated that other than the interprocessor communication channel 304, resource sharing between the high side 303 and the low side 301 is minimal. This separation reduces/minimizes the risk of any data flow or leakage from the high host 310 via the high LAN interface 204 to the low host 314 via the low LAN interface 206. The administrator interface 220 is configured to enable an administrator at workstation 312 to perform administrative tasks. For example, the administrative interface 220 may be coupled with the high processor 302 via a serial interface 410. The network pump 106 also includes a power interface 416 configured to connect to power and reset control device 412 to perform power and reset control functions.

The network pump 106 also receives initial configuration and control information across the administrator interface 220. The administrator interface 220 may also be used for providing error and performance reports. The configuration information determines which application program interfaces (APIs) configured to operate with the second network 104—the APIs specified by an IP address and port number on the second network 104, are permitted to open a connection to transmit messages to application program interfaces configured to operate with the first network 102 and specified by an IP address and port number on the first network 102. In embodiments of the present invention, the second and first communication networks 104, 102 are alternatively referred to herein as low LAN 104, and high LAN 102, respectively.

In one embodiment, the network pump 106 is configured as a hardware device supporting a pump protocol, such as for example, a communication protocol, across the high and low LAN interfaces, 204, 206, respectively. The network pump is configured to be compatible with protocols from the TCP/IP suite. For example, the pump protocol is described as supporting four layers—network access layer, internet layer, host-host transport layer, and application layer (listed from lowest to highest, with application layer at the top). The pump protocol is implemented at the application layer. The network pump 106 uses the pump specific application layer protocol to guarantee application level reliability and application independence.

Figure 5:
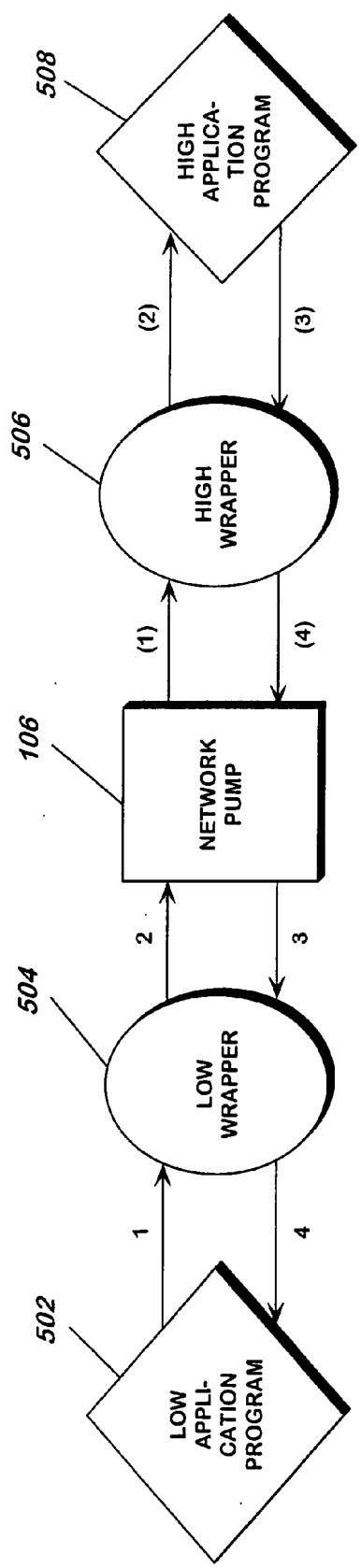
FIG. 5 illustrates an exemplary schematic of network pump acknowledgment process in one embodiment of the present invention.

The ability of the network pump 106 to support a variety of applications is provided by software that enables information flow, herein identified as low wrapper 504 and high wrapper 506 in FIG. 5, which runs on application systems of the first communication network 102 and the second communication network 104, respectively, that communicate with the network pump 106 over their respective LANs 206. For example, the low wrapper 504 is a software program configured to run on the low application program 502, and the high wrapper 506 is a software program configured to run on the high application program 508, respectively, and the network pump 106 is configured to communicate with the low application program 502 via the low wrapper 504, and with the high application program 508 via the high wrapper 506. The wrappers 504, 506 are configured to support the pump protocol on one side and other protocols which communicate with the network pump 106 is established, on the other. In one embodiment, the low and high wrappers 504, 506 (FIG. 5) may be single-level and untrusted software. For example, in such a case, installing or modifying a wrapper is a change to the software configuration on the application systems, and not to the architecture of the network pump 106.

Each application on the low LAN 104 that uses the network pump 106 communicates via an interface to a low wrapper 504, and, similarly, each application on the high LAN 102 that receives information from the pump communicates via an interface to a high wrapper 506. At the application protocol layer (not shown), the network pump 106 is configured to accept acknowledgment messages from the high LAN interface 204 that correspond to messages transmitted from the network pump 106 to the high wrapper 506. All other application-level traffic may be logged as erroneous and discarded. At the application protocol layer, the only traffic passed from the network pump 106 to the low wrapper 504 across the low LAN interface 206 for an active connection are preferably acknowledgments in a fixed, predefined format. Acknowledgment provided to the low wrapper 504 by the network pump 106 indicates that the network pump 106 has successfully received the data to be transmitted in a stable buffer 404 (which is embodied within the High RAM). In one embodiment, acknowledgments provided to the low wrapper 504 are internally generated by the network pump 106.

The timing of the application-layer acknowledgments sent across the low LAN interface 206 represents a covert timing channel. In one embodiment, this timing may be controlled according to an algorithm provided in the article "A Network Pump" by Kang et al., IEEE Transactions on Software Engineering, Vol. 22, No. 5, May 1996. This algorithm provides assurance that the capacity of the covert channel may be modeled and bounded analytically. For each active connection, a separate variable is maintained to reflect the moving average of the time it takes the high wrapper 506 to accept messages from the high LAN interface 204. Application-layer acknowledgments sent in response to messages received from the low wrapper 504 over the active connection are delayed randomly according to the moving average via a chosen random variable preferably of a pseudo-exponential or similar type. At the application layer, messages received over the active connection are acknowledge in the same order they are received. Information flow from the high wrapper 506 to the low wrapper 504 over a connection occurs through changes in the value of the random variable. The random variable value is not provided directly to the low wrapper 504—instead, it is provided via the network pump 106.

Figure 6:
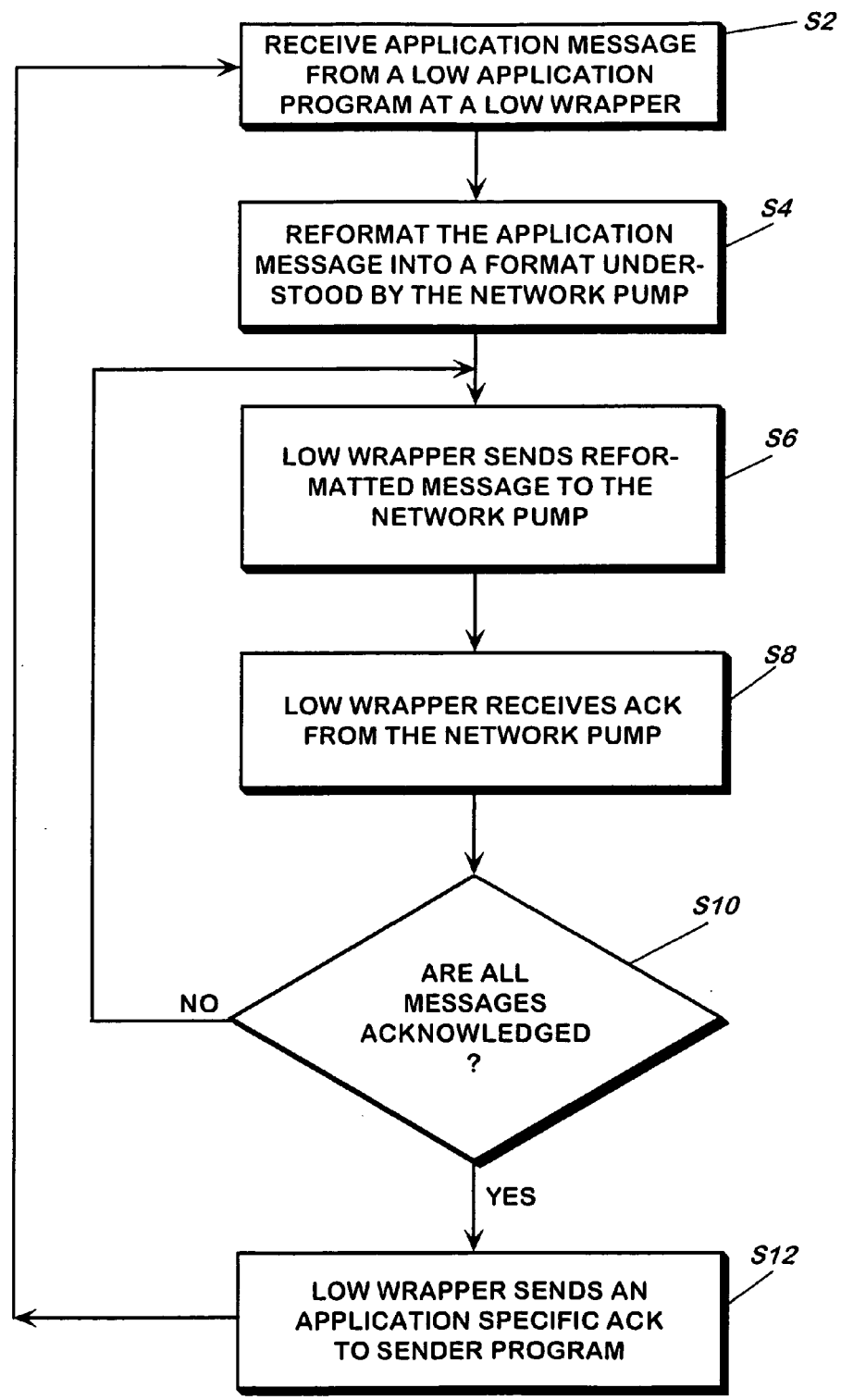
FIG. 6 is a flowchart illustrating an acknowledgment process between the network pump and the low application program in one embodiment of the present invention.

FIG. 6 is a flowchart illustrating network pump acknowledgment process between the network pump and the low application program in one embodiment of the present invention.

Initially, at a step S2, the low application program 502 sends a message to the low wrapper 504. At a step S4, the low wrapper reformats the application message into a format that the network pump 106 understands. The low wrapper then sends a message to the network pump at a step S6 and an acknowledgment message is received at the low wrapper at a step S8. An inquiry is made at step S10 to determine if all messages are acknowledged by the network pump.

If all messages are not acknowledged by the network pump, the process proceeds to step S6. Steps S6 and S8 are repeated until pump messages corresponding to the original application message have been passed and acknowledged by the network pump.

If all messages are acknowledged by the network pump, the process proceeds to step S12.

At a step S12, the low wrapper sends application specific acknowledgment to the sender program, and then process proceeds to step S2.

Figure 7:
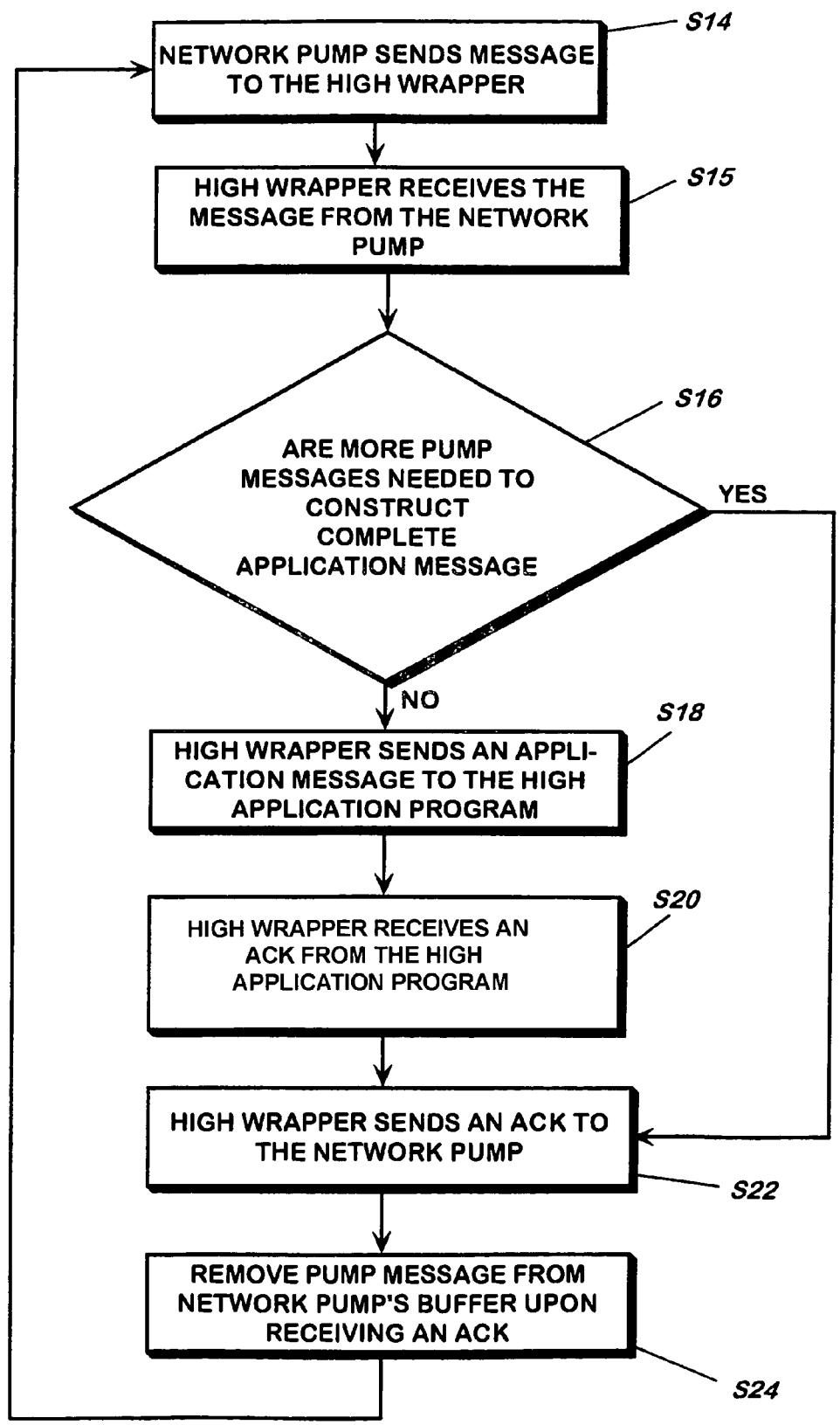
FIG. 7 is a flowchart illustrating an acknowledgment process between the network pump and the high application program in one embodiment of the present invention.

FIG. 7 is a flow chart illustrating the process steps involved in communicating information between the network pump and the high application program in one embodiment of the present invention.

Initially, at a step S14, if available, the network pump 106 sends a message to the high wrapper 506. At a step S16, an inquiry is made to determine if more pump messages are needed to construct an application message, and if so, the process proceeds to step S22. If no more pump messages are needed to construct an application message, the process proceeds to step S18.

At a step S18, the high wrapper 506 sends an application message to the high application program, and the process proceeds to step S20.

At a step S20, the high wrapper receives an acknowledgment from the high application program, and the process proceeds to step S22.

At a step S22, the high wrapper sends an acknowledgment message to the network pump 106, and the process proceeds to a step S24.

At a step S24, the message is removed from the network pump's buffer upon receiving an acknowledgment, and the process proceeds to step S14.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of communicating between a first network and a second network via a device, the first network having a first degree of trust and the second network having a second degree of trust that is higher than the first degree of trust, the device having a first processor in communication with the first network, a second processor in communication with the second network and an interface in communication with the first processor and the second processor, said method comprising:

providing control information to the second processor;
generating first status information in the first processor;
generating second status information in the second processor;
transmitting data from the first network to the first processor;
processing, via the first processor, the transmitted data from the first network to provide first processed data;
transmitting the first processed data to the interface;
transmitting the first processed data from the interface to the second processor,
processing, via the second processor, the first processed data to provide second processed data;
exchanging a portion of the first status information, a portion of the second status information and a portion of the control information between the first processor and the second processor;
acknowledging, at a probabilistic rate derived from a moving average of a rate at which the second processor is acknowledging messages from the second network, transmission from the first processor to the second processor via a communication channel between the first processor and the second processor; and
transmitting the second processed data to the second network,
wherein said transmitting the first processed data to the interface, said transmitting the first processed data from the interface to the second processor, said exchanging and said acknowledging of the transmission from the first processor to the second processor minimize data communication from the second network to the first network.

2. A method of communicating between a first network and a second network via a device, the first network having a first degree of trust and the second network having a second degree of trust that is higher than the first degree of trust, the device having a first processor in communication with the first network, a second processor in communication with the second network and an interface in communication with the first processor and the second processor, said method comprising:

providing limited control information from the second processor to the first processor;
generating first status information in the first processor;
generating second status information in the second processor;
transmitting data from the first network to the first processor;
processing, via the first processor, the transmitted data from the first network to provide first processed data;
transmitting the first processed data to the interface;
transmitting the first processed data from the interface to the second processor,
processing, via the second processor, the first processed data to provide second processed data;
exchanging a portion of the first status information, a portion of the second status information and a portion of the control information between the first processor and the second processor;
acknowledging, at a probabilistic rate derived from a moving average of a rate at which the second processor is acknowledging messages from the second network, transmission from the first processor to the second processor via a communication channel between the first processor and the second processor; and
transmitting the second processed data to the second network,
wherein said transmitting the first processed data to the interface, said transmitting the first processed data from the interface to the second processor, said exchanging and said acknowledging of the transmission from the first processor to the second processor minimize data communication from the second network to the first network.

3. A communication system for communicating between a first network and a second network, the first network having a first degree of trust and the second network having a second degree of trust that is higher than the first degree of trust, said communication system comprising:
   a first processor operable to receive data from the first network and to process the received data;
   an interface;
   a second processor; and
   communication lines connecting said first processor with said second processor and being operable to permit an exchange of status and control information between said first processor and said second processor,
   wherein said interface is operable to receive processed data from said first processor and to transmit the processed data to said second processor,
   wherein said second processor is operable to further process the processed data from said interface and to transmit the further processed data to the second network,
   wherein said interface is further operable to acknowledge, at a probabilistic rate derived from a moving average of a rate at which said second processor is acknowledging messages from the second network, transmission from said first processor to said second processor, and
   wherein said interface and said communication lines minimize data communication from the second network to the first network.

* * * * *